(12) United States Patent
Tsai et al.

(10) Patent No.: US 11,719,347 B2
(45) Date of Patent: Aug. 8, 2023

(54) CONTROL VALVE

(71) Applicant: COOLER MASTER CO., LTD., New Taipei (TW)

(72) Inventors: Shui-Fa Tsai, New Taipei (TW); Sy-Chi Kuo, New Taipei (TW); Hsin-Hung Chen, New Taipei (TW)

(73) Assignee: COOLER MASTER CO., LTD., New Taipei (TW)

( * ) Notice: Subject to any disclaimer, the term of this patent is extended or adjusted under 35 U.S.C. 154(b) by 117 days.

(21) Appl. No.: 17/188,555

(22) Filed: Mar. 1, 2021

(65) Prior Publication Data

US 2021/0180703 A1 Jun. 17, 2021

Related U.S. Application Data

(62) Division of application No. 16/018,842, filed on Jun. 26, 2018, now Pat. No. 10,969,024.

(30) Foreign Application Priority Data

May 14, 2018 (CN) .......................... 201820713027.9

(51) Int. Cl.
| | |
|---|---|
| *F16K 5/10* | (2006.01) |
| *F16K 11/076* | (2006.01) |
| *F16K 5/04* | (2006.01) |
| *F04B 49/22* | (2006.01) |
| *F16K 5/06* | (2006.01) |

(Continued)

(52) U.S. Cl.
CPC .................. *F16K 5/10* (2013.01); *F16K 5/04* (2013.01); *F16K 11/076* (2013.01); *F04B 49/225* (2013.01); *F16K 3/26* (2013.01); *F16K 5/0407* (2013.01); *F16K 5/06* (2013.01); *F16K 5/12* (2013.01); *Y10T 137/2501* (2015.04); *Y10T 137/7839* (2015.04)

(58) Field of Classification Search
CPC . F16K 5/10; F16K 5/04; F16K 5/0407; F16K 5/06; F16K 5/12; F16K 11/076; F16K 3/26; F04B 49/225; Y10T 137/7839; Y10T 137/2501
See application file for complete search history.

(56) References Cited

U.S. PATENT DOCUMENTS

| | | | | |
|---|---|---|---|---|
| 762,936 A | ‡ | 6/1904 | Paige | .................. F16K 37/0016 |
| | | | | 137/556.6 |
| 2,140,292 A | ‡ | 12/1938 | Jensen | ...................... F16K 5/10 |
| | | | | 251/209 |

(Continued)

*Primary Examiner* — Craig M Schneider
*Assistant Examiner* — Christopher D Ballman
(74) *Attorney, Agent, or Firm* — Maschoff Brennan

(57) ABSTRACT

A control valve includes a valve body and a valve gate, the valve body has an inner space, first fluid inlets, second fluid inlets, and a fluid outlet, the valve gate is movably located inside the inner space, the first fluid inlets are located at a side of the fluid outlet, the second fluid inlets are located at another side of the fluid outlet, the first fluid inlets and the second fluid inlets are arranged along a radial direction of the valve gate, the valve gate has a main channel having a first inlet end, a second inlet end, and an outlet end, the first inlet end is connected to the first fluid inlets, the second inlet end is connected to the second fluid inlets, and the outlet end is connected to the fluid outlet.

11 Claims, 2 Drawing Sheets

(51) Int. Cl.
*F16K 3/26* (2006.01)
*F16K 5/12* (2006.01)

(56) References Cited

U.S. PATENT DOCUMENTS

| | | | | | |
|---|---|---|---|---|---|
| 3,605,787 | A | * | 9/1971 | Krogfoss et al. | F16K 3/26 137/219 |
| 3,612,102 | A | ‡ | 10/1971 | Hulsey | F16K 5/10 137/625.3 |
| 3,700,003 | A | ‡ | 10/1972 | Smith | F16K 5/0207 137/614.17 |
| 3,976,087 | A | * | 8/1976 | Bolton | B01F 35/88 366/160.5 |
| 4,364,409 | A | ‡ | 12/1982 | Jones | G05D 7/0106 137/486 |
| 4,774,984 | A | ‡ | 10/1988 | Peters | F16K 47/045 137/625.32 |
| 4,881,718 | A | ‡ | 11/1989 | Champagne | F16K 5/0605 251/209 |
| 5,050,631 | A | * | 9/1991 | Konno | F16L 41/03 137/271 |
| 5,332,004 | A | ‡ | 7/1994 | Gethmann | F16K 5/0605 137/625.32 |
| 5,372,224 | A | ‡ | 12/1994 | Samonil | F16F 9/468 188/282.3 |
| 5,439,020 | A | * | 8/1995 | Lockhart | B60S 3/04 422/281 |
| 5,524,863 | A | ‡ | 6/1996 | Davis | B08B 9/00 137/625.32 |
| 5,551,467 | A | ‡ | 9/1996 | Booth | F16K 5/0605 137/1 |
| 5,927,330 | A | * | 7/1999 | Minton | F16K 11/085 251/367 |
| 5,983,937 | A | * | 11/1999 | Makihara | F24D 19/1015 251/207 |
| 6,021,812 | A | ‡ | 2/2000 | Iwamoto | F16K 5/0605 137/625.3 |
| 6,880,575 | B2 | ‡ | 4/2005 | Mountford | F16K 11/074 137/625.41 |
| 7,036,793 | B2 | ‡ | 5/2006 | Turnau, III | F16K 5/0414 251/175 |
| 7,111,643 | B2 | ‡ | 9/2006 | Oh | F16K 5/0689 137/625.41 |
| 7,111,644 | B2 | * | 9/2006 | Rehder | F16L 41/03 137/884 |
| 7,343,933 | B2 | * | 3/2008 | McBeth | F16K 11/074 137/625.46 |
| 7,448,410 | B2 | ‡ | 11/2008 | Keiser | F16K 5/0605 137/625.47 |
| 8,262,062 | B2 | ‡ | 9/2012 | Kamo | F16K 5/0428 251/209 |
| 8,322,367 | B2 | * | 12/2012 | Harris | F16K 27/003 137/884 |
| 9,421,559 | B2 | * | 8/2016 | Cornett | B05B 1/202 |
| 9,453,579 | B2 | ‡ | 9/2016 | Bisio | F16K 5/204 |
| 9,903,481 | B2 | ‡ | 2/2018 | Keller | F16K 5/12 |
| 9,904,294 | B2 | ‡ | 2/2018 | Guidetti | F16K 5/04 |
| 10,107,240 | B2 | * | 10/2018 | Fletcher | F02M 35/10275 |
| 10,215,293 | B2 | * | 2/2019 | Hiraoka | H01L 23/473 |
| 10,215,295 | B2 | * | 2/2019 | Babbini | F04B 49/225 |
| 10,301,050 | B2 | ‡ | 5/2019 | Donati | B65B 55/103 |
| 10,302,224 | B2 | * | 5/2019 | Kluz | F16K 47/08 |
| 10,465,675 | B2 | ‡ | 11/2019 | Crolius | F04B 49/007 |
| 2002/0109118 | A1 | ‡ | 8/2002 | Brinks | F16K 5/12 251/209 |
| 2003/0205685 | A1 | ‡ | 11/2003 | Whang | F16K 5/10 251/209 |
| 2012/0085951 | A1 | ‡ | 4/2012 | Ludwig | F16K 31/055 251/129.04 |

\* cited by examiner
‡ imported from a related application

CONTROL VALVE

CROSS-REFERENCE TO RELATED APPLICATIONS

This patent application is a divisional patent application of U.S. patent application Ser. No. 16/018,842 filed on Jun. 26, 2018 and entitled "CONTROL VALVE", which is a non-provisional application claims priority under 35 U.S.C. § 119(a) on Patent Application No(s). 201820713027.9 filed in China on May 14, 2018, the entire contents of which are hereby incorporated by reference.

TECHNICAL FIELD

The disclosure relates to a control valve.

BACKGROUND

In a cooling system, a control valve or bypass valve is commonly used to change the direction of fluid. Taken the control valve as an example, there are a rotary spool-type valve and a slide spool-type valve. The rotary spool-type valve is a valve that can pivot about its axis, and the slide spool-type valve is a valve that can slide along its axis. These valves can be operated either manually or electrically.

Generally, in order to ensure low leakage, a valve gate of the control valve is usually made spherical. However, the spherical valve gate is larger than a through hole of a valve body of the control valve, thus the spherical valve gate cannot be directly installed into the valve body via the through hole. The valve body must be able to be disassembled into many pieces for installing the spherical valve gate into the valve body. This makes the configuration of the control valve complicated and is inconvenient for assembly and manufacturing.

SUMMARY

Accordingly, the present disclosure provides a control valve which is simple in structure so as to avoid the inconveniences in the conventional control valve.

One embodiment of the disclosure provides a control valve, including a valve body having an inner space and a valve gate movably located inside the inner space. The control valve has a lower flow rate limit which is greater than zero. The valve body has a plurality of first fluid inlets, a plurality of second fluid inlets and a fluid outlet, the plurality of first fluid inlets are located at a side of the fluid outlet, the plurality of second fluid inlets are located at another side of the fluid outlet, the plurality of first fluid inlets and the plurality of second fluid inlets are arranged along a radial direction of the valve gate, the valve gate has a main channel, the main channel has a first inlet end, a second inlet end and an outlet end, the first inlet end is connected to the plurality of first fluid inlets, the second inlet end is connected to the plurality of second fluid inlets, and the outlet end is connected to the fluid outlet.

According to the control valve as discussed in above, the control valve has a lower flow rate limit which is greater than zero when it is in the closed position, which ensures fluid to still flow to a lower temperature heat source even when most of the fluid flows to a higher temperature heat source, thereby having a minimal cooling effect on the lower temperature heat source.

Furthermore, the lower flow rate limit has no necessary to be zero, thus it is acceptable to have a cylindrical valve gate but not a spherical valve gate. Therefore, the valve gate can be directly installed into the valve body via the opening, which allows the valve body to be made of a single piece so as to simplify the processes of manufacturing and assembly.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Figure 1:
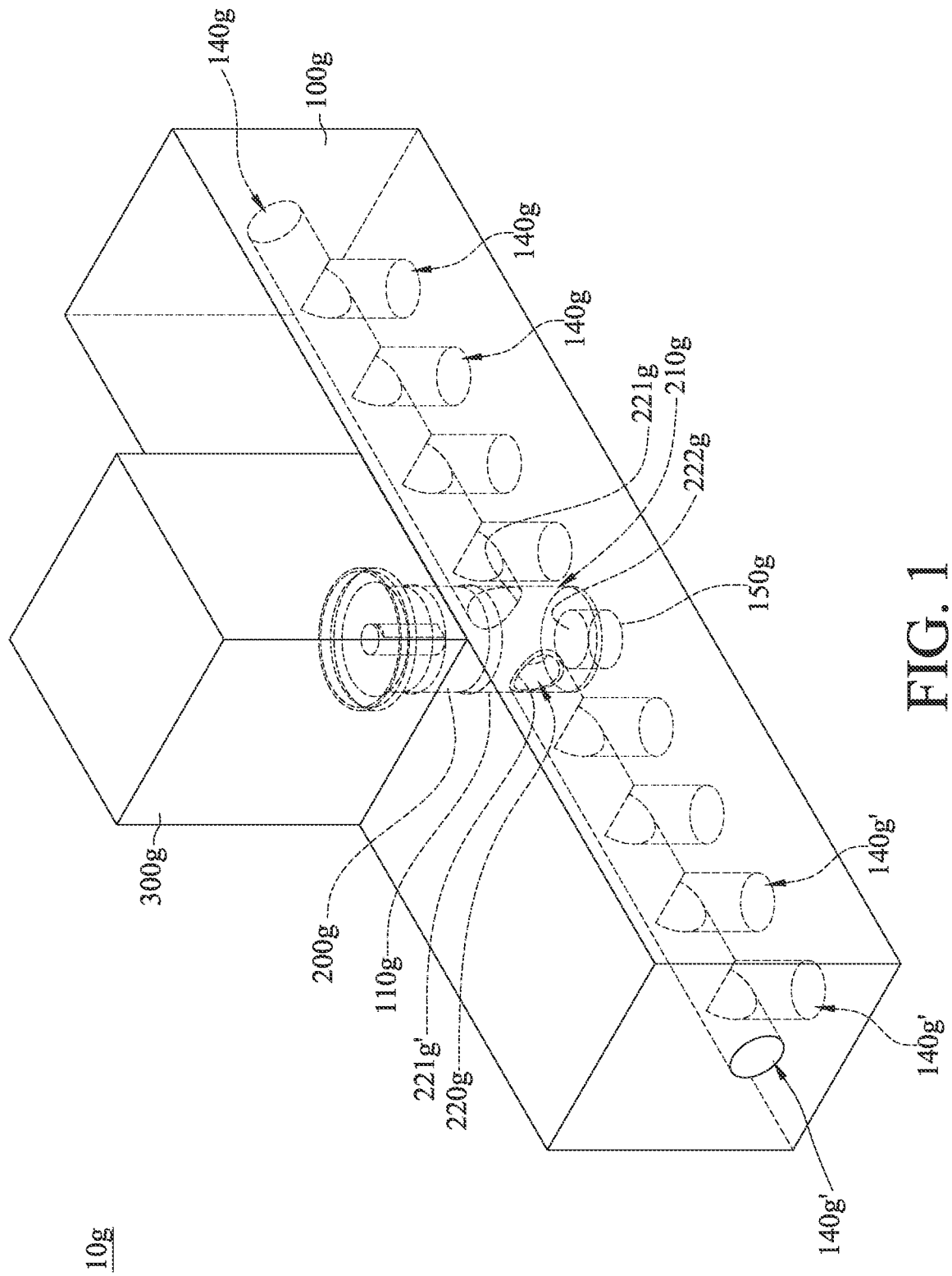
FIG. 1 is a perspective view of a control valve according to a seventh embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known main structures and devices are schematically shown in order to simplify the drawing.

Figure 2:
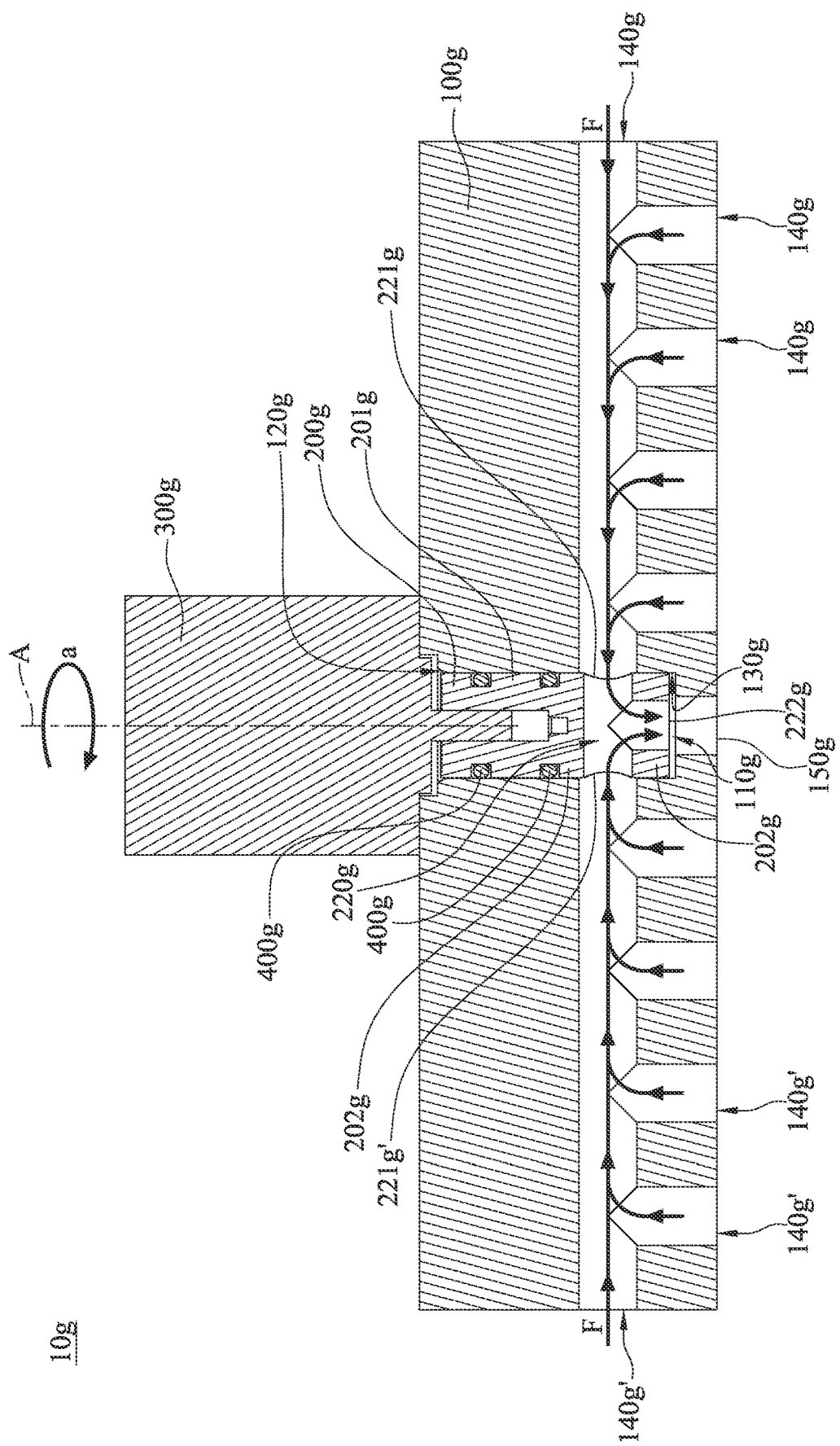
FIG. 2 is a cross-sectional view of FIG. 2.

Please refer to FIGS. 1-2. FIG. 1 is a perspective view of a control valve according to a seventh embodiment of the present disclosure. FIG. 2 is a cross-sectional view of FIG. 1.

This embodiment provides a control valve 10g. The control valve 10g includes a valve body 100g, a valve gate 200g, a driving element 300g, and a plurality of seal rings 400g. The valve body 100g is, for example, made of a single piece, by injection molding process or cutting process. The valve body 100g has an inner space 110g and an opening 120g corresponding to the inner space 110g. The valve body 100g has an inner wall 130g surrounding the inner space 110g.

The valve gate 200g is pivotably located inside the inner space 110g and is pivotable between a closed position and an opened position. In detail, the valve gate 200g includes an insertion portion 201g and a cylindrical head 202g which are connected to each other. The insertion portion 201g is disposed through the opening 120g, and the cylindrical head 202g is located in the inner space 110g. The seal rings 400g are, for example, rubber rings, and are sleeved on the insertion portion 201g, such that the insertion portion 201g and the seal rings 400g together seal the opening 120g. The driving element 300g is fixed on the valve body 100g, and is configured to drive the valve gate 200g to pivot about an axis A (e.g., in a direction of a) with respect to the valve body 100g.

In detail, the valve body 100g has a plurality of first fluid inlets 140g, a plurality of second fluid inlets 140g' and a fluid outlet 150g which correspond to the inner space 110g. That is, the opening 120g, the first fluid inlets 140g, the second fluid inlets 140g', and the fluid outlet 150g are all connected to the inner space 110g. The fluid outlet 150g is located at the bottom surface of the valve body 100g. The first fluid inlets 140g are located at a side of the fluid outlet 150g. The second fluid inlets 140g' are located at another side of the fluid outlet 150g opposite to the first fluid inlets 140g, and the first fluid inlets 140g and the second fluid inlets 140g' are arranged along a radial direction of the valve gate 200g. As shown, the same side of one of the first fluid inlets 140g is directly connected with the rest of the first fluid inlets 140g, and one of the first fluid inlets 140g extends in a direction perpendicular to the axial direction of the valve gate 200g while the rest of the first fluid inlets 140g extend in the same direction as the axial direction of the valve gate 200g; similarly, the same side of one of the second fluid inlets 140g' is directly connected with the rest of the second fluid inlets 140g', and one of the second fluid inlets 140g' extends in a direction perpendicular to the axial direction of the valve gate 200g while the rest of the second fluid inlets 140g' extend in the same direction as the axial direction of the valve gate 200g. In this embodiment, the first fluid inlets 140g and the second fluid inlets 140g' are respectively located at two opposite sides of the fluid outlet 150g, but the present disclosure is not limited thereto. In some other embodiments, the first fluid inlets and the second fluid inlets may be respectively located at two adjacent sides of the fluid outlet.

The valve gate 200g has an external wall 210g and a main channel 220g. The main channel 220g is in a cylinder shape. The main channel 220g penetrates through the external wall 210g. The main channel 220g has a first inlet end 221g, a second inlet end 221g' opposite to the first inlet end 221g, and an outlet end 222g connected to and corresponding to the fluid outlet 150g. When the valve gate 200g is in the opened position, the first inlet end 221g and the second inlet end 221g' are respectively aligned with and connected to the one of the first fluid inlets 140g and one of the second fluid inlets 140g', such that fluid can flow in a direction of F towards the fluid outlet 150a via the main channel 220g. When the valve gate 200g is in the closed position, the first inlet end 221g and the second inlet end 221g' are completely unaligned with the first fluid inlets 140g and the second fluid inlets 140g', which prevents fluid from flowing through the main channel 220g.

In this embodiment, the first inlet end 221g of the main channel 220g and the first fluid inlet 140g and the second fluid inlet 140g' of the valve body 100a are the same in shape, and/or the first inlet end 221g of the main channel 220g and the first fluid inlet 140g and the second fluid inlet 140g' of the valve body 100g are the same in size. By this configuration, when the first inlet end 221g and the second inlet end 221g' of the main channel 220g are respectively aligned with the first fluid inlet 140g and the second fluid inlet 140g' of the valve body 100g, fluid can flow in the direction of F from the first fluid inlet 140g and the second fluid inlet 140g' to the fluid outlet 150g in a smoother manner. However, the present disclosure is not limited to such configuration. In some other embodiments, the first inlet end 221g of the main channel 220g and the first fluid inlet 140g and the second fluid inlet 140g' of the valve body 100g may be in different shapes and sizes.

Then, taking a liquid cooling system in a server cabinet (not shown) as an example to explain the reason why the lower flow rate limit of the control valve 10g is greater than zero. The liquid cooling system in the server cabinet (not shown) includes a plurality of water blocks, a plurality of pipes, a pump and a plurality of control valves 10g. The water blocks are disposed at different servers in the server cabinet so as to exchange heat with these servers, or disposed at different heat sources in the same server so as to exchange heat with these heat sources. The pipes are connected between the water blocks and the pump so as to form a cooling circulation. The control valves 10g are installed on the pipes in order to control the flow rate for each heat source. It is understood that a higher temperature heat source requires larger flow rate, and a lower temperature heat source requires lesser flow rate, thus the control valve 10g corresponding to the higher temperature heat source would be switched to the opened position, and the other control valve 10g corresponding to the lower temperature heat source would be switched to the closed position so as to ensure most of the fluid to flow to the higher temperature heat source. Even so, the control valve 10g corresponding to the lower temperature heat source still have a lower flow rate limit which is greater than zero, thus fluid still will flow to the lower temperature heat source even when most of the fluid flows to the higher temperature heat source, thereby having a minimal cooling effect on the lower temperature heat source.

On the other hand, the lower flow rate limit has no necessary to be zero, thus it is acceptable to have a cylindrical valve gate 200g but not a spherical valve gate. Therefore, the cylindrical head 202g of the valve gate 200g can be directly installed into the valve body 100g via the opening 120g, which allows the valve body 100g to be made of a single piece so as to simplify the processes of manufacturing and assembly of the control valve 10g.

In this embodiment, the quantity of the seal rings is two, but the present disclosure is not limited thereto. In some other embodiments, the control valve may only have one seal ring or more than three seal rings. Furthermore, in the previous embodiment, the valve gate is driven by an electric motor, but the present disclosure is not limited thereto. In some other embodiments, the valve gate may be driven or controlled by fluid pressure. In addition, the valve body may further have heat fins for heat dissipation.

According to the control valve as discussed in above, the control valve has a lower flow rate limit which is greater than zero when it is in the closed position, which ensures fluid to still flow to a lower temperature heat source even when most of the fluid flows to a higher temperature heat source, thereby having a minimal cooling effect on the lower temperature heat source.

Furthermore, the lower flow rate limit has no necessary to be zero, thus it is acceptable to have a cylindrical valve gate but nor a spherical valve gate. Therefore, the valve gate can be directly installed into the valve body via the opening, which allows the valve body to be made of a single piece so as to simplify the processes of manufacturing and assembly.

Moreover, the different widths of the cross sections of the two sides of the main channel help the flow rate control of the valve gate to become more of a linear trend line.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A control valve, comprising:
a valve body, having an inner space; and
a valve gate, pivotably disposed inside the inner space;
wherein the valve body has a plurality of first fluid inlets, a plurality of second fluid inlets and a fluid outlet which are all connected to the inner space, the plurality of first fluid inlets are located at a side of the fluid outlet, the plurality of second fluid inlets are located at another side of the fluid outlet, the plurality of first fluid inlets and the plurality of second fluid inlets are arranged along a radial direction of the valve gate, the valve gate has a main channel, the main channel has a first inlet end, a second inlet end and an outlet end, the first inlet end is connected to the plurality of first fluid inlets, the second inlet end is connected to the plurality of second fluid inlets, and the outlet end is connected to the fluid outlet;

wherein the valve body is made of a single piece with inner surfaces defining the inner space, the plurality of first fluid inlets, the plurality of second fluid inlets, and the fluid outlet.

2. The control valve according to claim 1, wherein a same side of one of the plurality of first fluid inlets is directly connected with the rest of the plurality of first fluid inlets.

3. The control valve according to claim 1, wherein one of the plurality of first fluid inlets extends in a direction perpendicular to an axial direction of the valve gate while the rest of the plurality of first fluid inlets extend in the same direction as the axial direction of the valve gate.

4. The control valve according to claim 1, wherein a same side of one of the plurality of second fluid inlets is directly connected with the rest of the plurality of second fluid inlets.

5. The control valve according to claim 1, wherein one of the plurality of second fluid inlets extends in a direction perpendicular to an axial direction of the valve gate while the rest of the plurality of second fluid inlets extend in the same direction as the axial direction of the valve gate.

6. The control valve according to claim 1, wherein the fluid outlet is located at a bottom surface of the valve body.

7. The control valve according to claim 1, wherein the main channel has a circle-shaped cross section.

8. The control valve according to claim 1, wherein the plurality of first fluid inlets and the plurality of second fluid inlets are respectively located at two opposite sides of the fluid outlet.

9. The control valve according to claim 1, further comprising at least one seal ring sleeved on an insertion portion of the valve gate and located between and pressed by the valve body and the insertion portion.

10. The control valve according to claim 1, wherein the main channel has a cross section which has a first side and a second side opposite to each other, and a width of the first side is substantially equal to a width of the second side.

11. The control valve according to claim 1, wherein the valve body is made of a single piece and has an opening corresponding to the inner space, the valve gate is disposed through the inner space via the opening.

\* \* \* \* \*